July 11, 1933. J. T. HECK 1,917,369
PORTABLE PICTURE SCREEN STAND
Filed Feb. 21, 1931  2 Sheets-Sheet 1
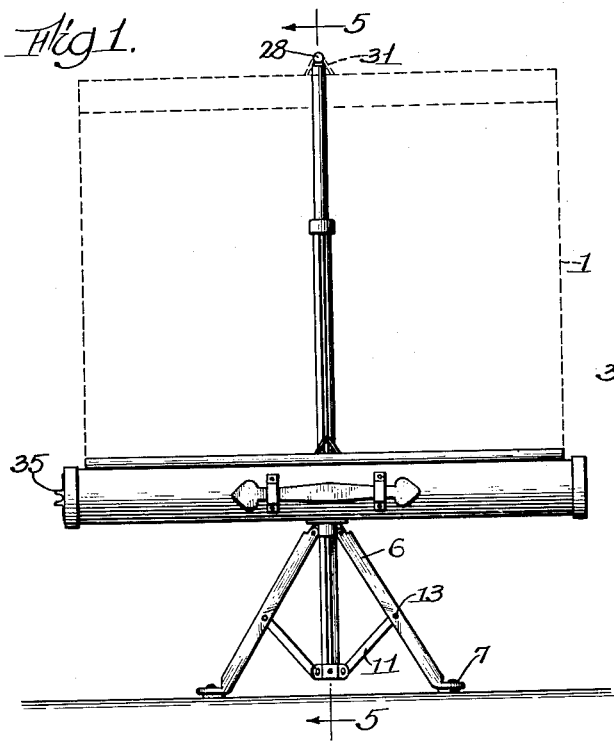
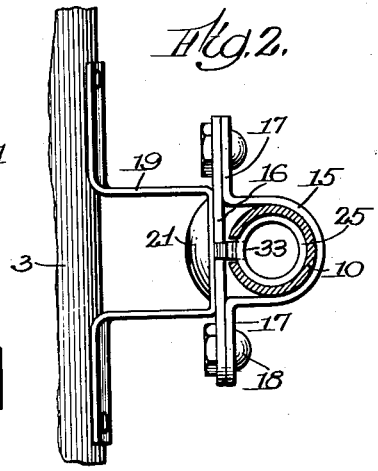
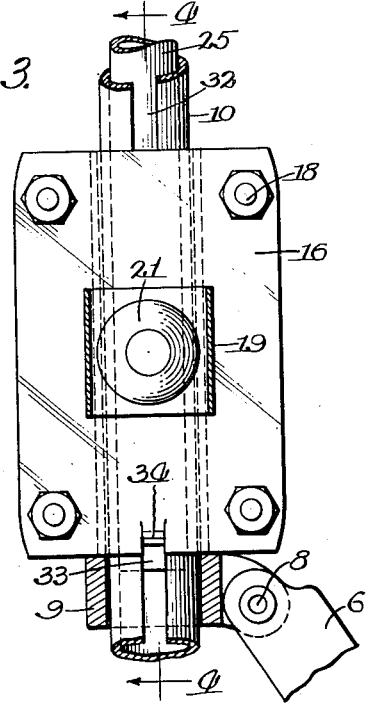
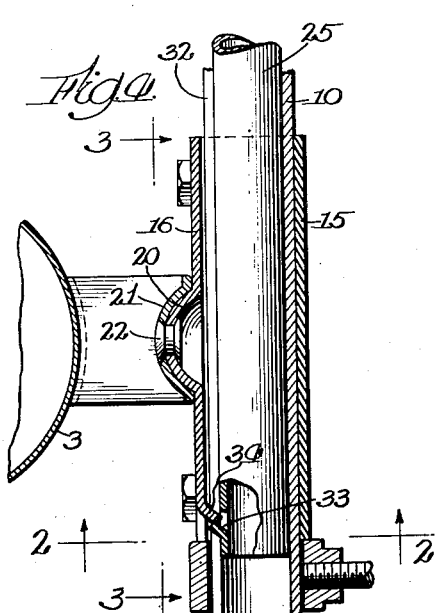
Inventor:
John T. Heck
By George J. Hight Atty.

July 11, 1933. J. T. HECK 1,917,369
PORTABLE PICTURE SCREEN STAND
Filed Feb. 21, 1931 2 Sheets-Sheet 2
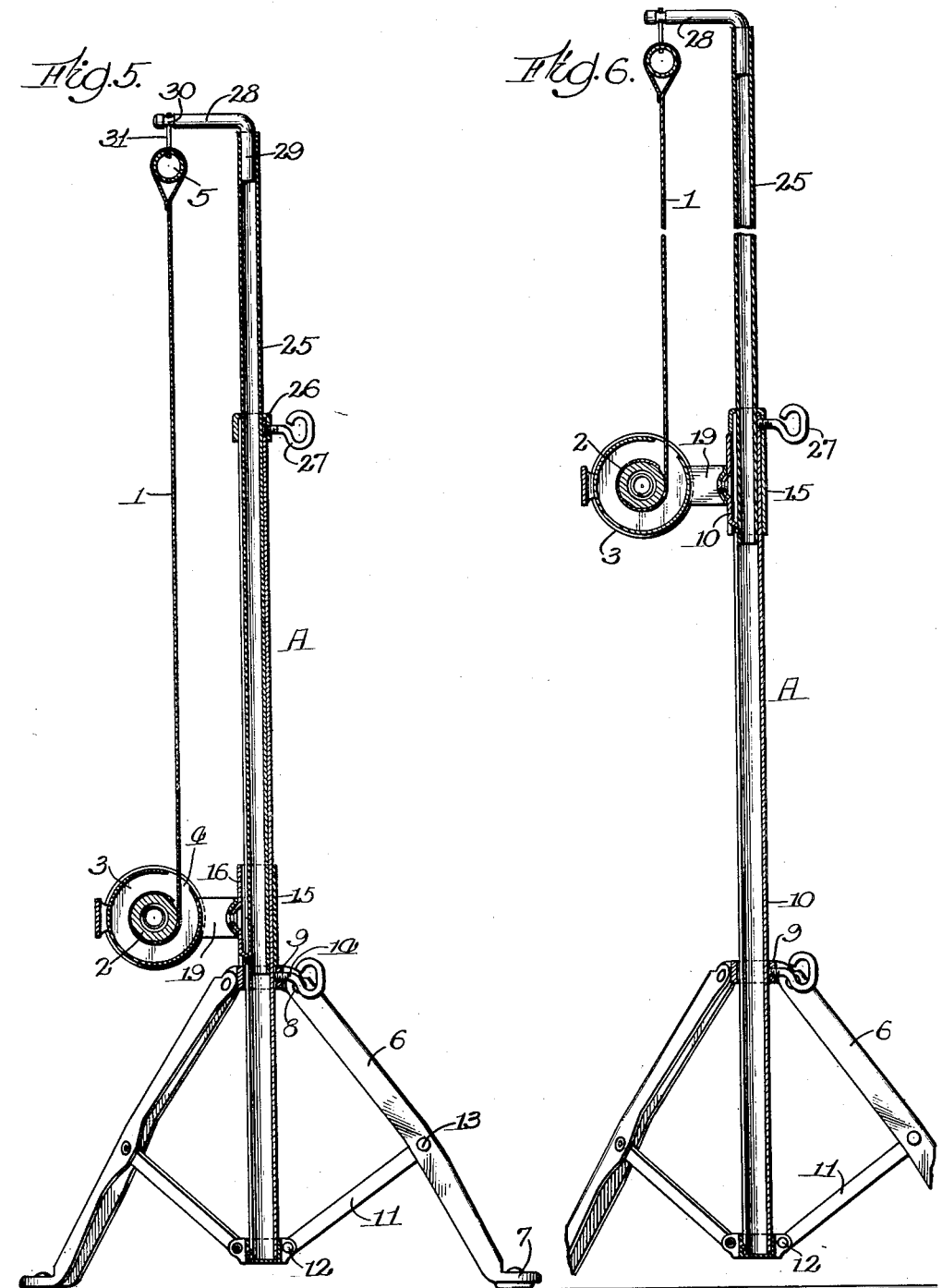
Inventor:
John T. Heck
BY: George T. Haight Atty.

Patented July 11, 1933

1,917,369

UNITED STATES PATENT OFFICE

JOHN T. HECK, OF CHICAGO, ILLINOIS, ASSIGNOR TO DA-LITE SCREEN CO., OF CHICAGO, ILLINOIS, A CORPORATION OF ILLINOIS

PORTABLE PICTURE SCREEN STAND

Application filed February 21, 1931. Serial No. 517,387.

My invention relates to an improved collapsible stand or support for portable picture screens and involves a structure wherein the picture screen is carried upon a suitable reel and the stand supports the screen in proper position for use.

One of the objects of my invention is to provide a collapsible portable stand which automatically raises and lowers the screen bodily to and from its proper height in the act of extending and collapsing the stand.

A further object is to provide a foldable and collapsible stand upon which the reel of picture screen is mounted and which provides for first extending the screen the proper distance from its reel and then shifting the screen while in its extended condition to the proper height for use, whereby the adjustment of the position of the extended screen is brought about by the movement of the parts of the stand in the act of unfolding or extending the same.

A still further object is to provide an improved stand structure capable of being collapsed into small compass for portability, and of being quickly and conveniently opened or extended to position for use, and having its parts arranged related in a manner to accomplish the above objects.

A further object is to provide a portable stand structure of the type referred to, which is simple and strong in construction, light in weight and relatively inexpensive to manufacture.

Other objects of my invention will appear hereinafter.

Referring to the accompanying drawings,

Fig. 1 is a view in elevation of a structure embodying my invention, the stand and screen reel being shown in position ready to raise the screen to the proper height for use;

Fig. 2 is an enlarged detail transverse section on the line 2—2 of Fig. 4;

Fig. 3 is an enlarged detail vertical section on the line 3—3 of Fig. 4;

Fig. 4 is a vertical section on the line 4—4 of Fig. 3;

Fig. 5 is an enlarged vertical section on the line 5—5 of Fig. 1, showing the screen extended and the structure ready to raise the screen to the proper height; and Fig. 6 is a section similar to Fig. 5, showing the stand fully extended and the screen in its raised position.

The structure shown in the drawings is designed more particularly as a portable screen-holding stand for use in connection with portable still or motion picture projectors. It is arranged so that the screen and stand are combined in a unit which, when not in use, can be reduced in size by being folded or collapsed into small compass and in suitable form to be carried about, but which can be readily unfolded and set up for use. With this arrangement the screen is held taut in a definitely open condition for use, and can be raised or lowered on the stand to position it at any desired height without disturbing the adjustment of the screen.

The screen 1 is in the form of a flexible web or band of suitable width and length wound upon a spool or reel 2, which is contained within a tubular casing 3. The screen and reel form no part of my present invention and are well known in the art. The reel is spring-actuated, acting to keep the screen web wound upon itself within the tubular casing 3. When the screen is to be extended for use, the web is simply pulled against the tension of the reel and the desired length withdrawn from the casing in the manner of a curtain. When the tension is released the reel automatically re-rolls the screen web upon itself. The casing has an elongated slot 4 through which the screen passes. When rolled upon the reel, the screen is contained within and completely protected by the casing. The free end of the screen web is attached in any suitable manner to a rigid tubular member 5, extending the full width of the screen and providing a rigid means for equalizing the tension on the web and preventing it from buckling or wrinkling.

The stand comprises a post or standard A adapted for upright or vertical position and having at its lower end a group of three folding legs comprising a tripod. The legs 6 have suitable feet 7 at their lower ends, and at their upper ends they are pivoted or hinged at 8 to a ring 9 which is slidable on the lower tubular post member 10. Folding brace links 11 are hinged at their inner ends 12 to a suitable fitting at the lower end of the post member 10, and at their outer ends 13 they are pivotally attached to the legs midway of the length thereof, whereby the legs, by sliding the ring along the tube, can be folded into close relation to the post member or unfolded and extended outwardly to provide a suitable support for the device. The ring 9 has a thumb screw 14 by which it may be fastened to the post member to hold the legs in adjusted position.

Above the ring 9 is a sleeve formed by a U-shaped member 15 and a plate 16, which is freely slidable up and down the post member 10. The U-shaped member 15 has outstanding flanges 17 to which the front plate 16 is fastened by means of bolts 18, so that the two members 15 and 16 form a unit which supports the screen casing 3. The screen casing 3, centrally of its ends, has an outstanding U-shaped bracket 19 fastened thereto, this bracket being of sufficient depth to space the screen casing the proper distance from the post. A pivotal connection is provided between the bracket 19 and the sliding sleeve, which permits the screen casing to be rotated vertically for folding it into compact relation to the post. The screen casing can thus be arranged with its longitudinal axis at right angles to the vertical axis of the post A, or when folded up the screen casing can be rotated about its pivot to a position with its longitudinal axis substantially parallel with the vertical axis of the post member, this being done after the screen has been released and wound upon its reel in the casing.

In this parallel position, means, hereinafter described, are provided for locking it in place. The pivotal connection between the bracket 19 and the sliding sleeve is formed by hemispherical bosses 20 and 21 in the plate 16 and the bracket member 19 respectively, and nesting these bosses, one within the other, and centrally fastening the two together by a rivet 22, as shown more clearly in Figs. 3 and 4.

A tubular extension 25 is telescoped within the post member 10 and is adapted to be withdrawn from or inserted into the post member 10 for the purpose of elongating or shortening the overall height of the post A. The upper end of the post member 10 has a reinforcing ring 26 carrying a thumb screw 27 adapted to engage and hold the extension 25 at any height to which it is adjusted.

At its upper end, this extension has a horizontally turned arm 28 preferably made of a short piece of metal rod having one end 29 turned downwardly and anchored in the upper end of the extension by crimping or welding. This arm has a notch or groove 30 at its outer end, which is engaged by a loop 31 carried by the bar 5 at the end of the screen web. The loop is of sufficient size and shape to permit its being freely slipped over the end of the arm 28 or detached therefrom.

The post member 10 has a vertical slot 32 extending substantially its entire length and the lower end of the extension 25 (Fig. 3) has a lug 33 formed up from its wall and adapted to project through the slot 32 to engage a corresponding in-turned lug 34 similarly formed up from the plate 16 of the sliding sleeve. This arrangement is provided so that when the extension 25 is withdrawn to elongate the post, the lug 33 engages the lug 34 and carries the sleeve upwardly along the post member 10. Thus the casing and reel is lifted to the height desired. The distance between the lug 33 and the arm 28 represents the length of screen withdrawn from the casing, so that after the screen has been unwound from the reel the desired extent and the end thereof connected to the arm 28, the movement of the extension 25 automatically operates to shift the screen and its reel bodily to the desired height without disturbing the exposed length of screen.

Assuming now that the structure is to be set up for use and that the supporting legs have been unfolded and the screen casing has been rotated into horizontal position, as shown in Figs. 1 and 5. In this condition, the extension 25 is in its lowest position in the post member 10. The screen web is withdrawn from the casing far enough to hook the loop 31 over the end of the arm 30. The operator takes hold of the arm 28 and withdraws it upwardly from the post member 10. Automatically the screen will be further unreeled until the lug 33 engages the lug 34. This position of the parts corresponds to the extent to which the screen 1 should be unreeled to provide the proper exposure area. If it is desired to use the structure while the screen is in this low position, as shown in Fig. 5, the operator simply needs to set up the thumb screw 27 and hold the extension 25 in that position. If, however, it is desired to raise the screen to a greater height, the operator raises the extension 25 the desired height, and since the lug 33 has engaged the lug 34 the entire screen, reel and casing will be bodily raised to the desired position simply in the act of raising the extension, as shown in Fig. 6. It is simply necessary, then, to set the extension 25 in this position by means of the thumb screw 27. The interlock between the lug 33 and the slot 32 of the post member 10 prevents the reel or screen from rotating about a vertical axis.

In collapsing the structure, the reverse of these operations takes place, namely: the thumb screw 27 is loosened, the extension 25 lowered to its lowermost position in the post member 10, the loop 31 is detached and the screen is permitted to reel up in the casing.

The legs may then be folded up and the casing may be rotated to a vertical position parallel with the post A. In order to lock the casing in this position, I provide the end thereof with a forked lug 35 (Fig. 1), between the prongs of which the notched end of the arm 28 enters, thus holding the casing against rotation. After the casing is thus locked in position, the thumb screw 27 may be set up against the extension 25 to hold it from accidental displacement.

It is obvious that changes may be made in the construction, arrangement and operation of the parts without departing from the spirit of the invention, and I contemplate such changes as fairly fall within the scope of the appended claims.

I claim:

1. In a structure of the class described, the combination of an upright standard having supporting legs and having an elongated slot therein, a screen web and a reel therefor, a mounting for said reel slidable on said standard, an extension for the standard for raising and lowering the height thereof, means operated by said extension and extending through said slot for engaging said mounting for correspondingly raising and lowering the screen reel in definite relation to said extension, and means associated with said extension for holding a definite length of screen web unwound from the reel in any position to which the reel and extension are moved.

2. In a structure of the class described, the combination with a supporting standard, a screen web and a reel upon which said web is wound, a mounting for the reel movable vertically on said standard, an extension telescoped with said standard to vary the height thereof, means associated with said extension and adapted to engage said mounting for raising and lowering the reel on the standard in the act of raising and lowering the extension, and means associated with the extension to which the web is adapted to be connected for maintaining a predetermined length of web unwound from the reel in any position to which the extension and reel are adjusted.

3. In a structure of the class described, the combination with a tubular supporting standard having an elongated slot, a screen web and a reel upon which said web is wound, a mounting for the reel movable vertically on said standard, an extension telescoped with said standard to vary the height thereof, a latch associated with said extension and projecting through the slot for engaging the mounting for raising and lowering the reel on the standard in the act of raising and lowering the extension, means associated with the extension to which the web is adapted to be connected for maintaining a predetermined length of web unwound from the reel in any position to which the extension and reel are adjusted, and means for locking said extension and reel in their adjusted position.

4. In a portable screen stand of the class described, the combination of a tubular post having legs for supporting the post in vertical position and having an elongated slot in its wall, an extension member telescoped within said post and vertically adjustable to various heights, a screen reel and a mounting therefor slidable on the outside of said tubular post, for vertical movement thereon a tongue member on the extension extending through the slot for engaging the mounting for raising and lowering the reel with said extension, a screen web mounted upon said reel, and means associated with said extension for unwinding a predetermined length of screen web from the reel as the extension is moved and then maintaining this predetermined unwound length of web in any position to which the screen is adjusted by said extension.

5. In a portable screen stand of the class described, the combination of a tubular post having legs for supporting the posts in vertical position, an extension member telescoped within said post and vertically adjustable to various heights, a screen reel mounted horizontally upon said tubular post for vertical movement thereon and adapted to be raised and lowered by said extension, said reel being also rotatable into vertical position parallel with said post, a screen web mounted upon said reel, means associated with said extension for unwinding a predetermined length of screen web from the reel when the reel is in horizontal position and then maintaining this predetermined length of web in any position to which the screen is adjusted by said extension, and means cooperating with said extension for locking the reel against rotation from a parallel position.

6. In a portable and collapsible picture screen stand of the class described, the combination of a tubulalr post having legs at its lower ends for supporting the post in an upright position and having an elongated slot in its wall, a bracket slidable vertically on the outside of said post, a reel casing rotatable on the bracket and bodily movable with the bracket, a flexible picture screen web, a reel within the casing upon which said web is wound, an extension member telescoped within said tubular post and having a member extending through the slot and positioned to engage the bracket when a predetermined portion of the extension has been withdrawn from the post for raising and lowering said bracket to a predetermined height on said tubular post, and means on said extension with which the unwound end of the web is detachably engaged and spaced from said reel a predetermined distance in any position to which the casing and reel is adjusted.

7. In a structure of the class described, the combination of an upright tubular post member having an extension telescoped therewith for adjustment of the height thereof, an arm member at the upper end of said extension, a bracket vertically movable on said post member, a picture screen stretched between said arm and said bracket, and means on said extension arranged to engage the bracket when the extension has been withdrawn a predetermined length from the post for raising and lowering the bracket on the post member in definite spaced relation to the arm on the extension.

8. In a structure of the class described, the combination of a tubular upright supporting post having a longitudinal slot in its wall, a sleeve slidably mounted on the outside of said tubular support, a casing and a screen reeled therein carried by said sleeve, a screen web wound upon said reel, a rod telescoped within said tubular post and adjustable vertically therein, means on said rod to which the end of the screen web is detachably connected, and a projection on said rod extending through the slot in the post member to engage and move the sleeve when the web-attaching means is spaced a definite distance from the reel.

9. In a portable collapsible stand for picture screens, the combination of a casing and a reel therein having a flexible picture screen wound thereupon, a supporting member on which said casing is vertically movable, means for mounting said casing for rotation from horizontal position to a vertical position in parallel relation to the support, an extension on the support adapted for vertical adjustment to vary the height of the screen and having means to which the end of the screen is detachably connected when the reel and casing are in horizontal position, and means adapted to be engaged by said extension when the casing and reel are in parallel relation to the support for locking the casing against rotation.

JOHN T. HECK.